(12) United States Patent
Endres (10) Patent No.: US 9,920,695 B2
(45) Date of Patent: Mar. 20, 2018

(54) THRUST RECOVERY IN AIRPLANES (71) Applicant: Exhaustless Inc., Ann Arbor, MI (US)

(72) Inventor: Steven P. Endres, Ann Arbor, MI (US)

(73) Assignee: EXHAUSTLESS INC.

( * ) Notice: Subject to any disclaimer, the term of this patent is extended or adjusted under 35 U.S.C. 154(b) by 283 days.

(21) Appl. No.: 14/746,686

(22) Filed: Jun. 22, 2015

(65) Prior Publication Data
US 2016/0368614 A1 Dec. 22, 2016

(51) Int. Cl.
| | | |
|---|---|---|
| *F02C 7/27* | (2006.01) | |
| *F02K 1/32* | (2006.01) | |
| *B64D 37/00* | (2006.01) | |
| *F02C 9/18* | (2006.01) | |
| *F02C 9/46* | (2006.01) | |
| *F02C 7/262* | (2006.01) | |
| *F02C 7/26* | (2006.01) | |

(52) U.S. Cl.
CPC ............... *F02C 7/27* (2013.01); *B64D 37/00* (2013.01); *F02C 9/18* (2013.01); *F02K 1/32* (2013.01); *F02C 7/26* (2013.01); *F02C 7/262* (2013.01); *F02C 9/46* (2013.01); *F05B 2260/85* (2013.01); *F05D 2220/323* (2013.01); *F05D 2260/42* (2013.01); *F05D 2260/85* (2013.01); *F05D 2270/051* (2013.01)

(58) Field of Classification Search
CPC .... F02C 7/26; F02C 7/262; F02C 7/27; F02C 9/46; F02C 6/16; F02C 6/08; F05B 2260/85; F05D 2260/85
See application file for complete search history.

(56) References Cited

U.S. PATENT DOCUMENTS

| | | | | |
|---|---|---|---|---|
| 3,092,964 A | * | 6/1963 | Martin | F02C 7/262 60/39.091 |
| 3,591,962 A | * | 7/1971 | Connell | F02C 7/272 122/28 |
| 5,131,225 A | * | 7/1992 | Roettger | B64D 41/00 60/727 |
| 5,274,992 A | * | 1/1994 | Klaass | B64D 41/00 60/804 |
| 6,941,760 B1 | * | 9/2005 | Jones | F02C 7/268 60/727 |
| 2001/0045093 A1 | * | 11/2001 | Jacobson | F01D 1/30 60/602 |
| 2003/0129052 A1 | * | 7/2003 | Johnson | F01D 17/08 415/26 |
| 2007/0199331 A1 | * | 8/2007 | Maguire | F02C 3/107 60/796 |
| 2010/0191394 A1 | * | 7/2010 | Villaume | G05D 1/0083 701/16 |

* cited by examiner

*Primary Examiner* — Pascal M Bui Pho
*Assistant Examiner* — Katheryn Malatek
(74) *Attorney, Agent, or Firm* — Perkins Coie LLP (57) ABSTRACT

Several embodiments include a system and method for providing thrust recovery in an aircraft engine. The system and method enables a wider range of safe operation for aircraft where the aircraft engine is rapidly reactivated from a substantially deactivated state. The method thereby reduces noise output and fuel usage during descent and shortens runway lengths and occupancy time required for landing. Thrust recovery is provided via the use of stored bleed air being re-injected back into the aircraft engine. An onboard air storage tank and a system of valves facilitating this method are disclosed.

19 Claims, 8 Drawing Sheets

THRUST RECOVERY IN AIRPLANES

TECHNICAL FIELD

Embodiments relate to providing thrust recovery in planes during landing sequence. The embodiments more particularly relates to providing rapid thrust recovery while a plane's engine is disengaged to prevent situations from escalating into an emergency.

BACKGROUND

When descending into airports, aircraft must decrease altitude and airspeed. If the landing must be aborted, engine thrust must be increased to safely stop descent and restore climb as needed to attempt another landing. Thrust recovery includes the process of increasing thrust from a given operating state of the engine.

To ensure responsiveness to demand for increased thrust, pilots operate their engines during the final approach at a higher spin rate or thrust setting than optimal for descent. This practice produces noise and pollution over the entire portion of the approach. For a flight that aborts an attempted approach (less than 5% of all flights), the decision to do so is likely to occur close to the airport, after having wasted jet-fuel up to that decision time before needing more thrust from the engines.

Accordingly, there is a need to produce reliable, adequate thrust within the response time required by pilots while minimizing the wasted fuel burned and noise produced during approach.

DETAILED DESCRIPTION

Once an airplane has lined up for final approach into an airport, little engine thrust is needed from an energy perspective. Still, pilots must provide an adequate engine thrust response for safe control of the aircraft at all times during the flight. During the operational phases of takeoff, climb and cruise, engine response to throttle changes is less of a concern because response times are within a few seconds at the airspeeds and engine spin rates during these phases of flight. Reducing throttle during these phases can also quickly reduce thrust due to the work load demanded from and provided by the engine over these nominal operational conditions.

Landing includes four primary phases: descent, approach, touch-down, and deceleration. During landing, but just after touch down of the front wheels, pilots engage reverse thrust from the engines to slow the aircraft. The slow thrust recovery response time of the engine during reverse thrust leads to longer runway occupancy times and distances before safe runway exit that overall reduce the rate of arriving aircraft. The same slow thrust response governs the arrival capacity of runways where the time and distance required to slow down requires larger separation between successive arrivals. Traditional thrust recovery for arrivals also impacts overall airside capacity through interference between arrival and departure operations when departing aircraft must wait for arriving aircraft to pass while decelerating on an intersecting runway.

Within most of the descent portion of flight, the speed of the aircraft provides sufficient airflow for adequate throttle response. However, during final approach, the slow airspeed of the aircraft, combined with the reduced throttle and thrust setting for landing, puts the engine into a region of operation where slow responsiveness to changing throttle settings for increased engine thrust threatens the pilot's ability to safely abort the landing.

While some occasional thrust may be necessary for adjusting flight-specific conditions, in normal conditions, the thrust provided by the engine during final approach is counter-productive to the goal of slowing the aircraft. The active engines during final approach also leads to a larger angle of attack and spoilers to increase drag, to counter the thrust, and hence produce a bigger wake impact than needed to support flight. Larger wakes lead to larger separation between successive landings and lower arrival rates. The practice of active engines during landing works against the concept of continuous descent where the goal is for as passive a landing process as possible to minimize wake and landing process time.

The thrust recovery process begins as increased jet-fuel combustion produces suction at the intake to the compressors behind the fan that draws in more air for increased levels of combustion and so on. At slow air speeds and fan spin rates, abrupt increases in combustion can more readily draw exhausted air back through the bypass duct into the combustor than increase the angular velocity of the fan for fresh air.

With an adequate supply of oxygen or fresh air when the composite fan spin rates are low, high-pressure spool spin rates could increase rapidly and transfer energy to the low-pressure spool at the exhaust portion of the engine through the chemical heat and expansion that occurs from combustion. The faster increase in air flow through the engine will lead to a large suction behind the fan at the intake of the compressors to draw air through the fan to sustain increasingly higher rates of combustion than possible while otherwise air intake limited.

During typical active operation, the high bypass ratio turbo fan engines provide roughly 75% or more of delivered thrust from the bypass air stream with the remaining portion coming from the exhaust jet. During thrust recovery, more thrust could be supplied from a higher jet exhaust thrust and sooner by the technique of delivering stored air to the combustor during thrust recovery thereby aiding the thrust recovery. While the low-pressure spool is spinning up, low-pressure, slower turbines produce less load upon the exhaust jet that would result in a higher exhaust velocity that would provide immediate thrust at higher levels than possible while otherwise air intake limited.

Figure 1:
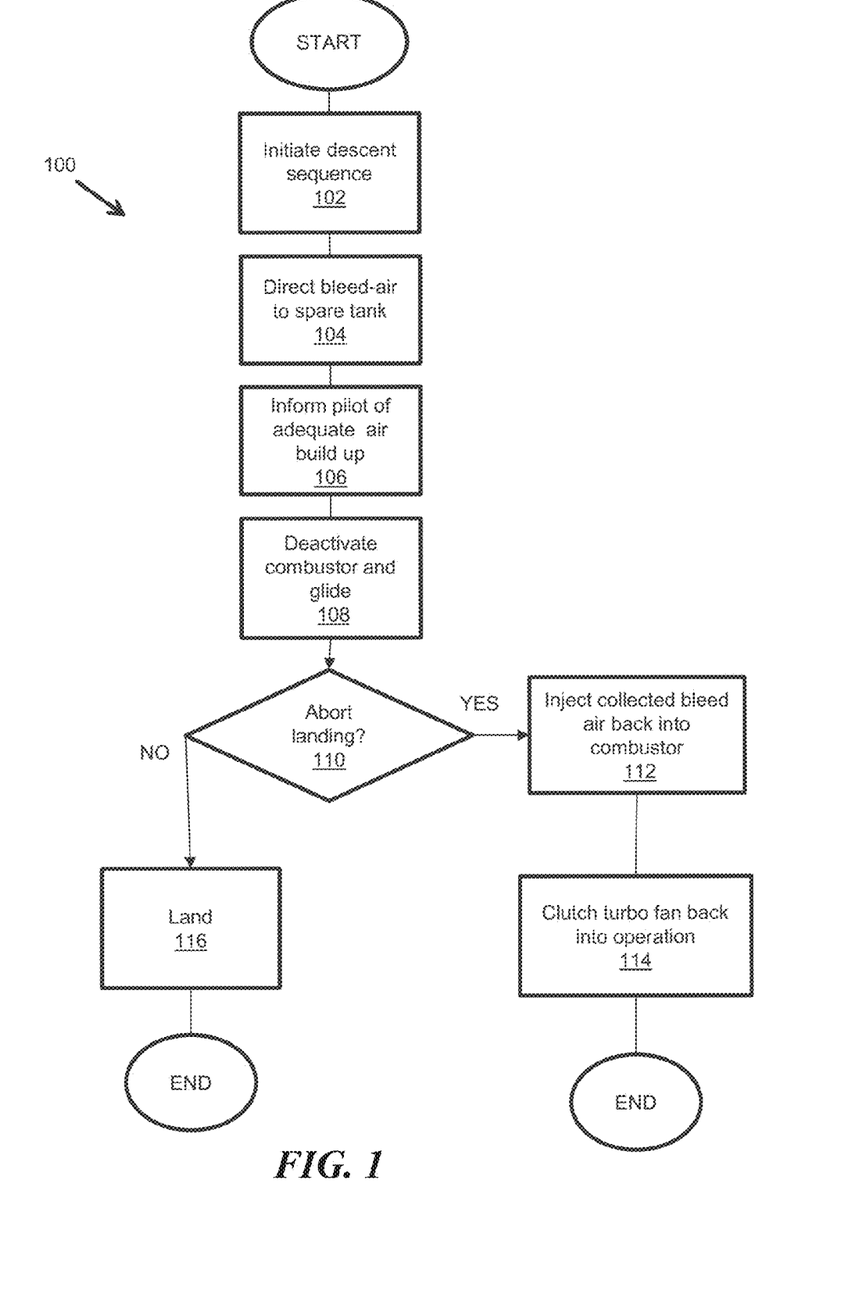
FIG. 1 is a flow chart illustrating a method of operating a jet engine in accordance with various embodiments.

FIG. 1 is a flow chart illustrating a method of operating a jet engine in accordance with various embodiments. In step 102, a plane begins a descent sequence. In step 104, during this descent sequence while the engines are still operational, a valve controller operates valves on feed lines to direct bleed air to an onboard air tank.

Bleed air in gas turbine engines is compressed air that is taken from the compressor stage of the engine, which is upstream of the fuel burning section. Engine bleed air comes from the high stage or low stage engine compressor section. Bleed air is valuable in an aircraft for two properties: high temperature and high pressure (e.g., 200-250° C. and 275 kPa (40 PSI), respectively). There are several kinds of bleed air in an engine: customer air, cooling air, nacelle de-icing air, and air used in bleed valves.

In various embodiments, inerting membranes generate a fourth class of bleed air: oxygen-rich bleed air. The process of "inerting" refers to separating oxygen, a comparatively reactive gas, out a gas mixture. Appropriate bleed air tap line systems create oxygen-rich bleed air. Oxygen-rich bleed air is created by tapping bleed air downstream of an inerting membrane, which accepts nitrogen-rich air, and directing the nitrogen-rich air toward other bleed air purposes (customer air). Oxygen separation from inert gases occurs onboard to remove $N_2$ supplied to fuel tanks to prevent the formation of volatile vapors. The remaining $O_2$ stored in the tank reduces nitrogen oxide compounds from forming as part of the thrust recovery process, and reduces the volume of air needed to supply a given mass of oxidation agent for combustion during aided thrust recovery. The engine supplies more thrust from the limited bleed air tube volume than possible from storing air with atmospheric concentrations of nitrogen.

In step 106, a pilot notification light turns on when a sufficient amount of bleed air is stored in the onboard air tank. In some embodiments, pilot notification appears as an indicator on a cockpit instrument panel. Illustrative examples of pilot notification lights include lights, colored lights, gauges, or any other suitable means known in the art of providing information to a pilot.

In step 108, when the plane's onboard storage tank accumulates enough extra bleed air to operate aided thrust recovery and has attained a sufficient approach distance, either the pilot or an automated landing module substantially deactivates the combustor in the plane's jet engines. Illustrative examples of "substantially deactivated" comprise: completely dormant, idling, any state where the jet engine is not providing thrust, and at a power level insufficient to keep the plane airborne indeterminately. In this state, the pilot then glides the plane in for landing.

Some cases of step 110 result in an aborted landing sequence. In step 112, when the landing sequence is aborted, a valve controller toggles valves directing air in the onboard air tank back into the jet engine, which provides the combustor with fresh air to burn. The air supplied by the onboard air tank provides a substitute for air that would be provided by the fan if the engine were active. The additional supply of air enables the combustor, or high-pressure spool, to reach high spin rates and transfer more chemical energy to the low pressure spool turbine and in turn to increase its spin rate to more quickly restore thrust within the time required to safely abort a landing attempt.

On-demand supply of the main oxidation agent at high pressure supports ongoing combustion of jet-fuel to produce a higher angular acceleration rate in the high-pressure spool from jet exhaust driving the turbine while the compressor is under a light load. The higher jet exhaust through the low-pressure turbines, in turn, produces a faster angular acceleration rate of the bypass turbofan. Hence, the desired thrust is realized sooner than could have been realized by waiting for the combustor to draw the same volume of air through the fan while operating under intake-limited conditions.

Delivery of air from the onboard tank increases the combustion rate as fast as possible for a given fuel delivery rate until a minimum spin rate of the high-pressure spool is reached. In step 114, an air clutching mode of operation reconnects the high spin rate combustor to the turbofan by reducing air supply from storage. In the air clutching sub-mode, a valve controller reduces air supply gradually to ensure combustor spin rates are held as high as possible while suction is increased behind the turbofan. When the landing is not aborted, the plane glides in for a landing without use of the stored air in the onboard tank.

Figure 2:
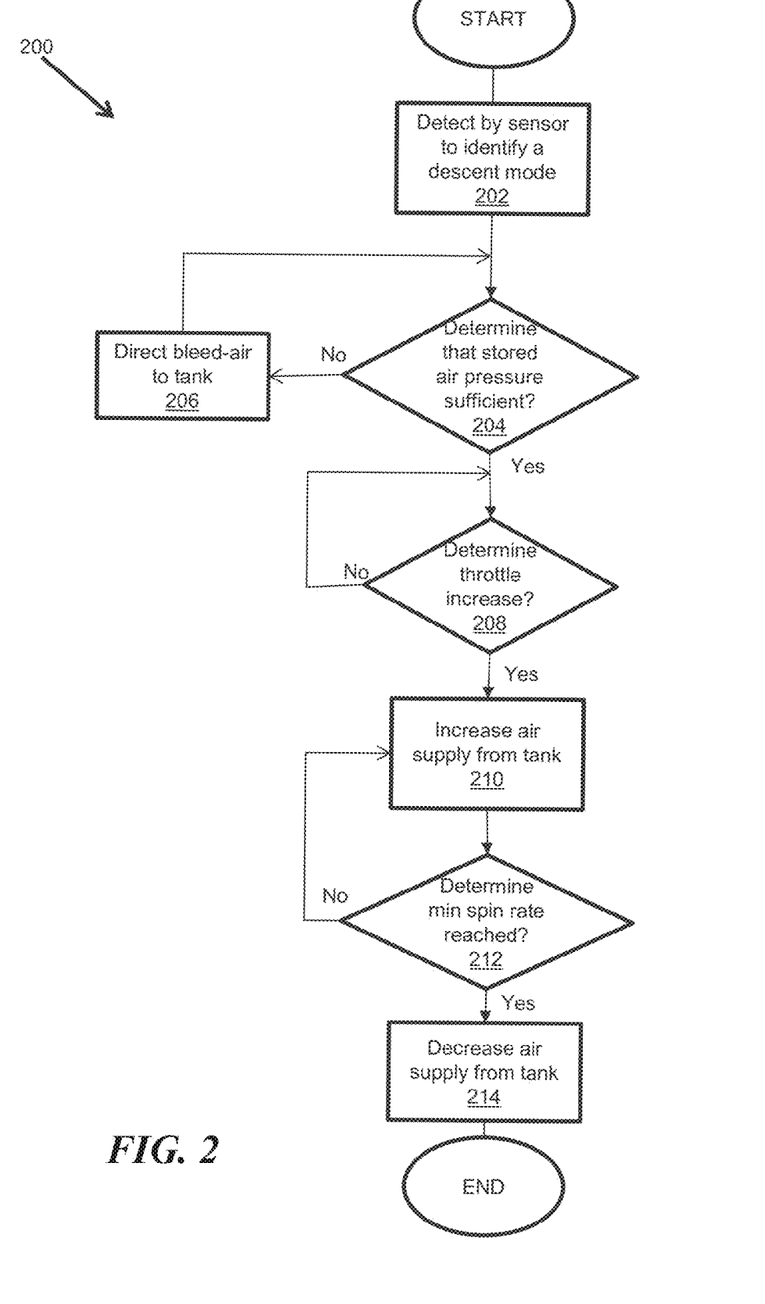
FIG. 2 is a flowchart illustrating a method of controlling an aircraft in accordance with various embodiments.

FIG. 2 is a flowchart illustrating a method of controlling an aircraft in accordance with various embodiments. The control system regulates the flow of air for aid during aided thrust recovery. In step 202, a sensor control system senses the turbofan rotational velocity, combustor turbine rotational velocity, fuel flow rate or throttle, storage tank pressure, bleed air pressure, compressor, flight speed and altitude. Airflow and remaining pressure are controlled through a computer and computer-controlled bi-directional valve.

Control during air storage regulates intake rates to ensure that bleed air supply line flow rates are sufficient for typical operation. In step 204, a sensor control system determines if storage tanks reach the minimal pressure and volume required for aided thrust recovery operation. Until that point, the aircraft operates as if the upcoming approach will require historical throttle settings. In step 206, if storage air has not reached a sufficient amount, the valve system or a sensor controller directs more air into the storage tank until the sufficient amount of air is reached. Once adequate storage of air is reached, the control system provides an indicator that aided thrust recovery is available.

In step 208, control systems detect requests during approach to enter into aided thrust-recovery mode. Once in this mode of operation, sensors detect an increase in thrust demanded by the pilot to engage the aided thrust recovery mode of operation.

Control during aided thrust recovery mode of operation involves two stages or sub-modes. In step 210, the delivery of air from the storage tank increases the combustor spin rate as fast as possible given fuel delivery rate until a minimum spin rate is reached. In step 212, sensors determine if the turbine and compressor (on the high-pressure spool) have reached the minimum spin rate to enter air clutching mode.

The clutching sub-mode of operation reconnects the high spin rate combustor turbine to the fan and reduces air flow from storage. In step 214, during the air clutching sub-mode, the valve system reduces air supply gradually to ensure combustor turbine spin rates are held as high as possible while normal airflow through the fan is increased to the compressors. Air flow from storage may start before combustion to prevent compressor stall during high-pressure spool spin up. The low-pressure spool (comprising the fan, the low-pressure compressor, the low-pressure turbine and the nozzle) may contain a gear reduction in very large bypass engines to slow fan tip speeds. These components spin in the 2,500-10,000 RPM range but are mechanically connected by a shaft. So the "air clutching" action happens in two places. The first is between the fan and compressor, and is caused through suction from the high-pressure compressor. The second is between the high-pressure turbine and the low-pressure turbine, and is caused by the exhaust jet. The high-pressure spool shaft comprises both the high-pressure turbine (sometimes referred to as the combustor turbine) and the high-pressure compressor. The increased rate of combustion enabled from the stored air increases the rate of change in work acting upon the low-pressure spool than is otherwise possible when operating in limited intake air conditions.

Figure 3:
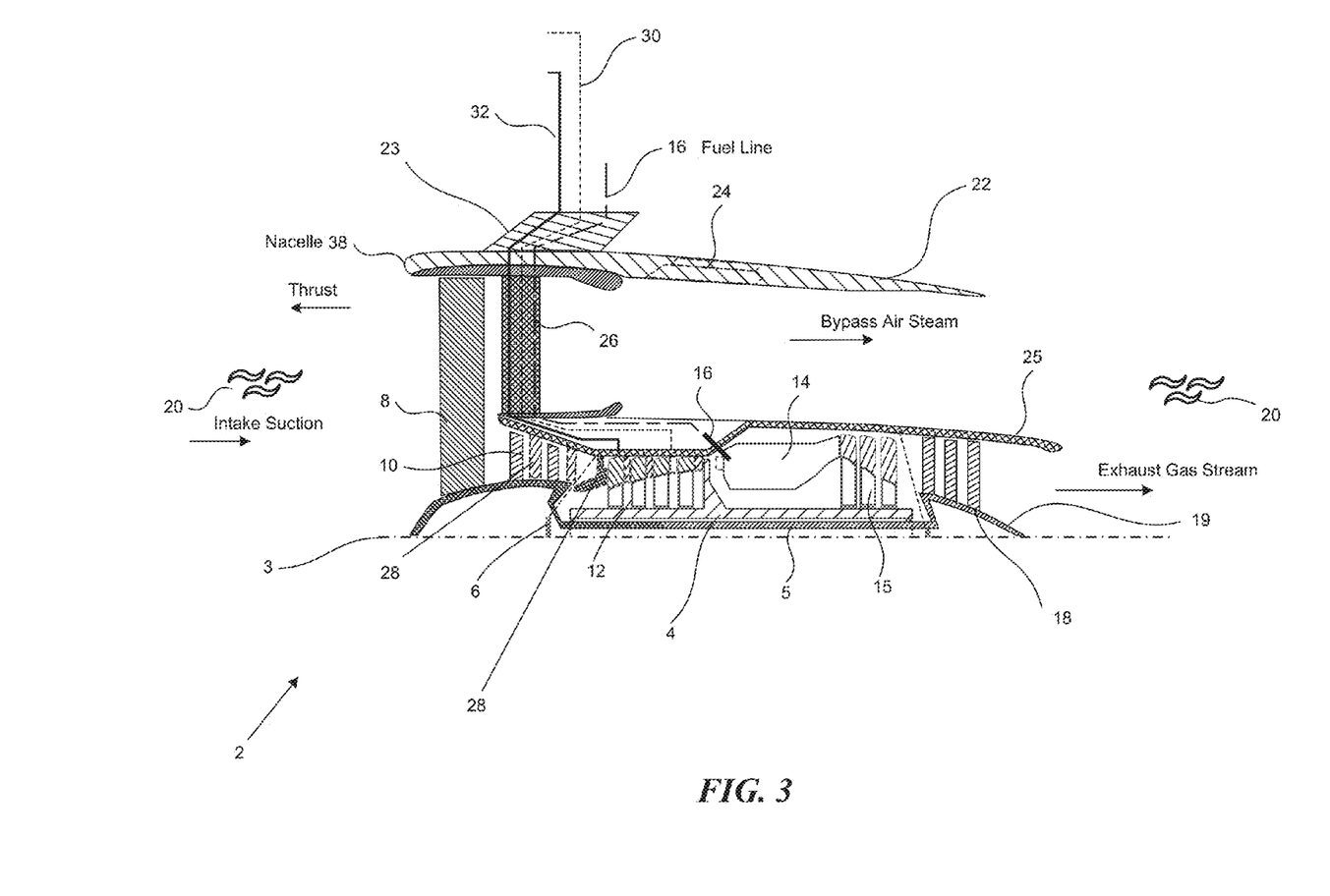
FIG. 3 is a cross-section of a jet engine according to various embodiments.

FIG. 3 is preferred embodiment of a high-ratio bypass turbofan engine 2. A bypass turbofan engine 2 includes many parts. The main components are two or more co-axial mounted spools, the high-pressure spool 4 and the low-pressure spool 5. The high-pressure spool 4 is mounted on, and has a greater diameter than the low-pressure spool 5. In some embodiments of a turbofan engine 2, the spools 4 and 5 interface with bearings 6. Each spool 4 and 5 are enabled to rotate independently. Rotating components on each spool are symmetric about the axis 3. Each spool 4 and 5 rotates about the same axis 3 with relative rates governed by the physics of airflow through the varying stages of compression, combustion, and decompression within the engine. Components on different spools 4 and 5 may rotate in alternate angular direction.

Each spool 4 and 5 includes active components. The low-pressure spool 5 comprises active components on either side of the high-pressure spool 4. Beginning from the left of the figure, the low-pressure spool 5 includes the fan 8, and the low-pressure compressor 10.

Continuing right, from the left, the high-pressure spool 4 comprises the high-pressure compressor 12, and the high-pressure turbine 15. The high-pressure turbine 15 is often referred to in this disclosure in conjunction with the combustor 14. The combustor 14 is a chamber where combustion reactions occur. The combustor 14 mixes jet fuel from a fuel source 16 and air to the correct conditions to react hydrocarbons in the jet fuel with oxygen from the working fluid 17. The combustor 14 does not actually spin; however, the most direct force of the combustion reactions are applied to spin the high-pressure turbine 15. For purposes of this disclosure, references to the combustor 14 "spinning" refer to the high-pressure turbine 15.

Returning to the low-pressure spool, the last components are the low-pressure turbine 18 and the nozzle formed between 19 and 25. Thus, the low-pressure spool 5 contains the fore-most fan 8 and aft-most turbine 18. The exhaust airflow works upon the high pressure and low-pressure turbines 15 and 18 as jet velocity increases before ejection into the atmosphere 20. Energy transferred to the high-pressure spool 4 increases the rate of airflow through the high-pressure compressor 12 providing more air to the combustor 14. Energy transferred to the low-pressure spool 5 increases the rate of airflow through the fan 8 and low-pressure compressor 10.

The outer-most housing 22 may be shaped differently between the top, bottom, and sides (not shown) to minimize drag on air flowing around the engine 2. Affixed to the outer-most housing 22 is a wing mount 23 which is used to connect the jet engine 2 to the wing of a plane. Additionally affixed to the outer-most housing 22 are reverse thrust doors 24. The reverse thrust doors open to deflect airflow during deceleration. The reverse thrust doors are configured to be used with various embodiments. Re-engaging the engine 2 can provide reverse thrust more quickly thereby decelerating a plane with forward velocity and enabling the plane to leave a runway sooner than otherwise safely possible.

There is additionally an inner-most covering, known as the combustor shroud 25. The outer-housing 22 and the combustor shroud 25 are structurally connected with a series of stationary support vanes 26. Additionally, the combustor shroud 25 includes a plurality of stationary vanes 28 which interface with the compressors 10 and 12. Additionally, the compressors 10 and 12 give off bleed air in tap lines 30 and 32.

Figure 4:
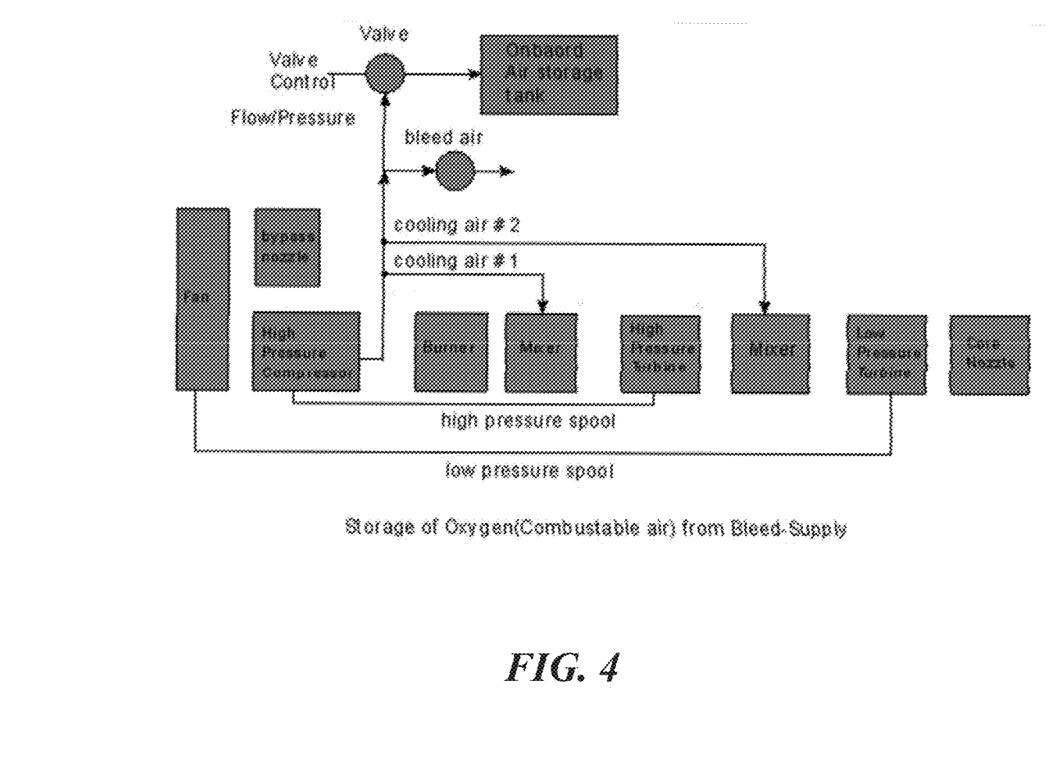
FIG. 4 is a block diagram of a jet engine illustrating bleed air draw according to various embodiments.

FIG. 4 is a block diagram of tap lines of the invention. In FIG. 4, boxes represent components of a jet engine 2, where the fan 8 is at the front of the engine and the core nozzle 19 is at the rear of the engine 2. Arrows represent direction of bleed air directed from the engine 2. In this embodiment, bleed air is tapped downstream of engine uses of bleed air for storage in the onboard tank. In this embodiment, only one feed line is displayed; however, in many embodiments, a plurality of feed lines is used to tap and deliver bleed air. Return air sent to the engine 2 is enabled to return through new bleed-air lines or existing lines. Existing lines can include the cooling lines.

Figure 5:
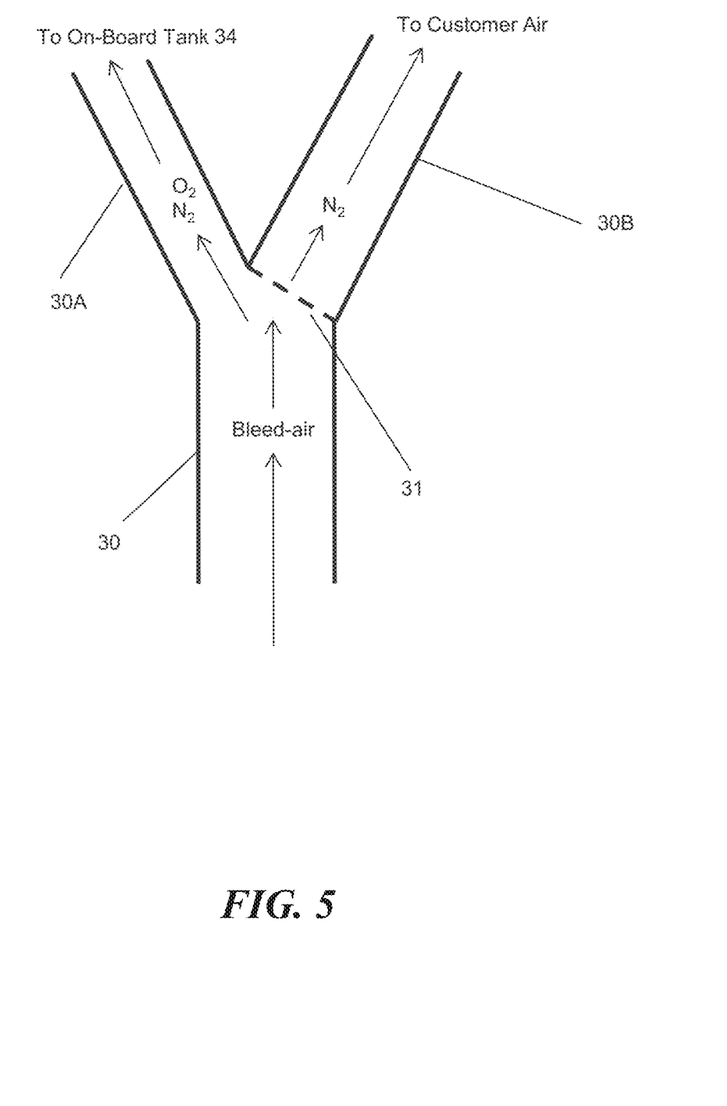
FIG. 5 is a blown up cross-section of a bleed air tap line according to various embodiments.

FIG. 5 is a blown up cross section of a bleed air tap line according to various embodiments. Bleed air tap lines tap the bleed air coming from the jet engine's two compressors 10 and 12. In some embodiments, a tap line 30 for bleed air contains branches: tap line branch 30A and tap line branch 30B. Air comprises roughly 21% oxygen and 78% nitrogen. In this illustrative embodiment, tap line 30B contains an inerting membrane 31. The inerting membrane 31 enables substantially only nitrogen, a gas that does not burn with fuel vapors, to flow down tap line branch 30B. The substantially dominant nitrogen gas is then directed toward normal customer air purposes.

In some embodiments, rather than an inerting membrane 31, a high-purity oxygen membrane (such as polymeric or ceramic membranes) or sponge (such as a zeolite sponge) is used to create substantially dominant oxygen gas. In these embodiments, the oxygen-rich gas flows down tap line branch 30B and the nitrogen-rich gas flows down tap line branch 30A. For these embodiments, where each tap line branch 30A and 30B end are reversed.

Not all of the nitrogen in the bleed air will flow through the inerting membrane 31; however, the remaining air will be oxygen rich (comprising noticeably more than 21% oxygen). The remaining oxygen-rich air is directed through tap line branch 30A. In this illustrative embodiment, the tap line branch 30A is directed toward an onboard tank 34; however, in some embodiments a valve system enables this oxygen-rich air to be directed to customer air as well.

Through use of an inerting membrane 31, the air provided back to the combustor during aided thrust recovery is oxygen rich and accordingly provides a more effective combustion reaction. A tradeoff that occurs with running the jet engine 2 on oxygen-rich air is that the combustion reactions are hotter. In some jet engines, if the percentage of oxygen in the air used to fuel the combustor is too high or even pure, the combustion reaction will melt parts of the engine. However, various embodiments are not intended for regular use in jet engines, nor prolonged use, and thus high concentration oxygen reactions are suitable in some jet engines.

Figure 6:
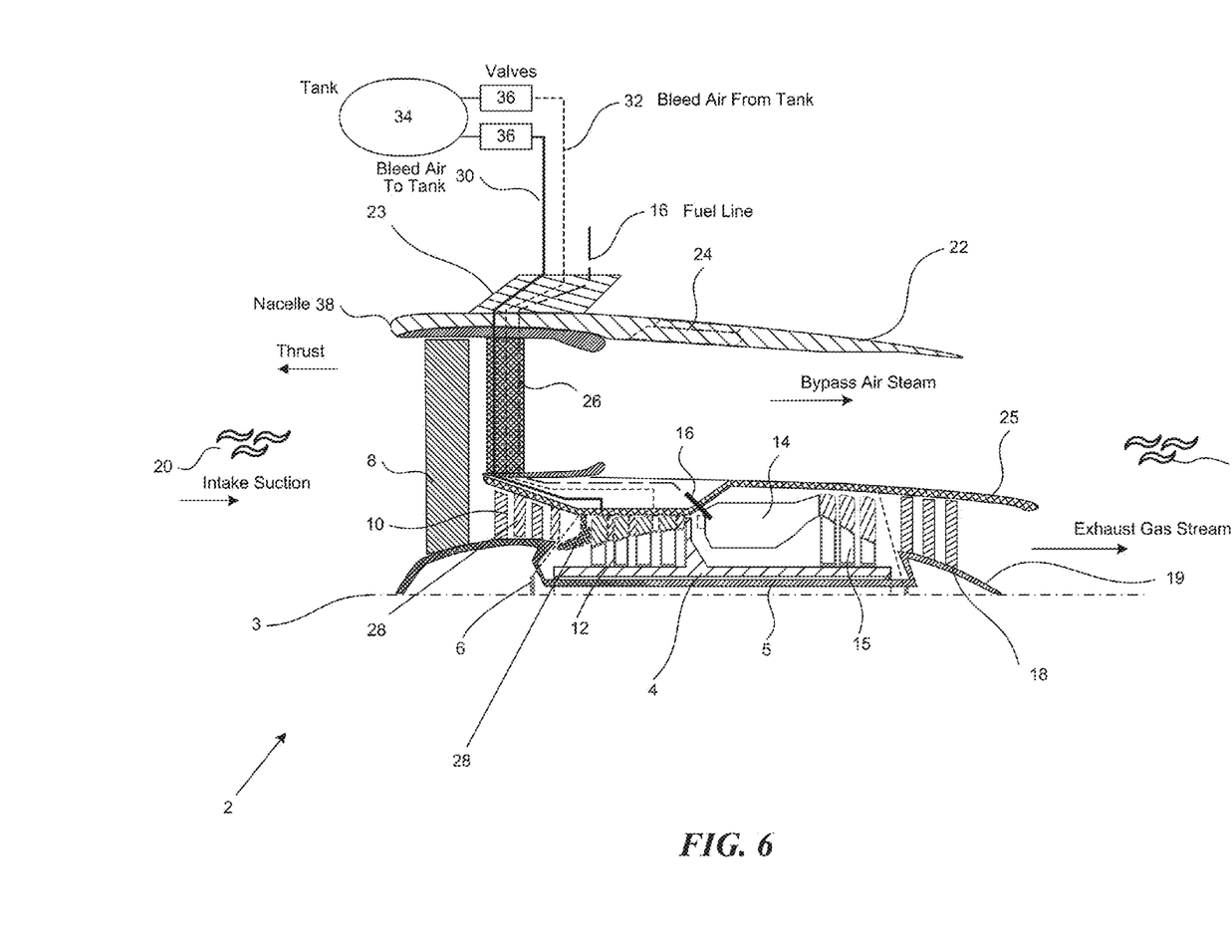
FIG. 6 is a cutaway illustration of an embodiment of jet engine with an onboard tank.

FIG. 6 is a cutaway illustration of an embodiment of a jet engine 2 with an onboard tank. The jet engine 2 is connected to an onboard tank 34 by a tap line 30 and an injection line 32. Both the tap line 30 and the injection line 32 are operated by valve system 36. In some embodiments, the onboard tank 34 serves the single purpose of providing air storage for aided thrust recovery. In other embodiments, the onboard tank 34 is a fuel tank.

In embodiments where the onboard tank 34 is a fuel tank used for jet-fuel, the fuel tank is preferably empty before used for bleed air storage. If the fuel tank is not first emptied of fuel, the bleed air would provide an oxidation path for fuel vapors. Potential fuel ignition in the onboard tank 34 is dangerous and preventing this condition is the main safety benefit of onboard inerting systems.

The injection line 32 in FIG. 6 is displayed as injecting bleed air into the aft-most end of the high-pressure compressor 12. In some embodiments of the onboard tank 34 when the onboard tank 34 is also a fuel tank, the injection line 32 is the same line used for fuel injection 16 into the combustor. This embodiment requires the fuel and air mixture temperature and pressure remain below the ignition point, but could provide a specific mixture best suited for the initial stages of aided thrust recovery specific to a particular engine model different than that used during normal operation.

Figure 7:
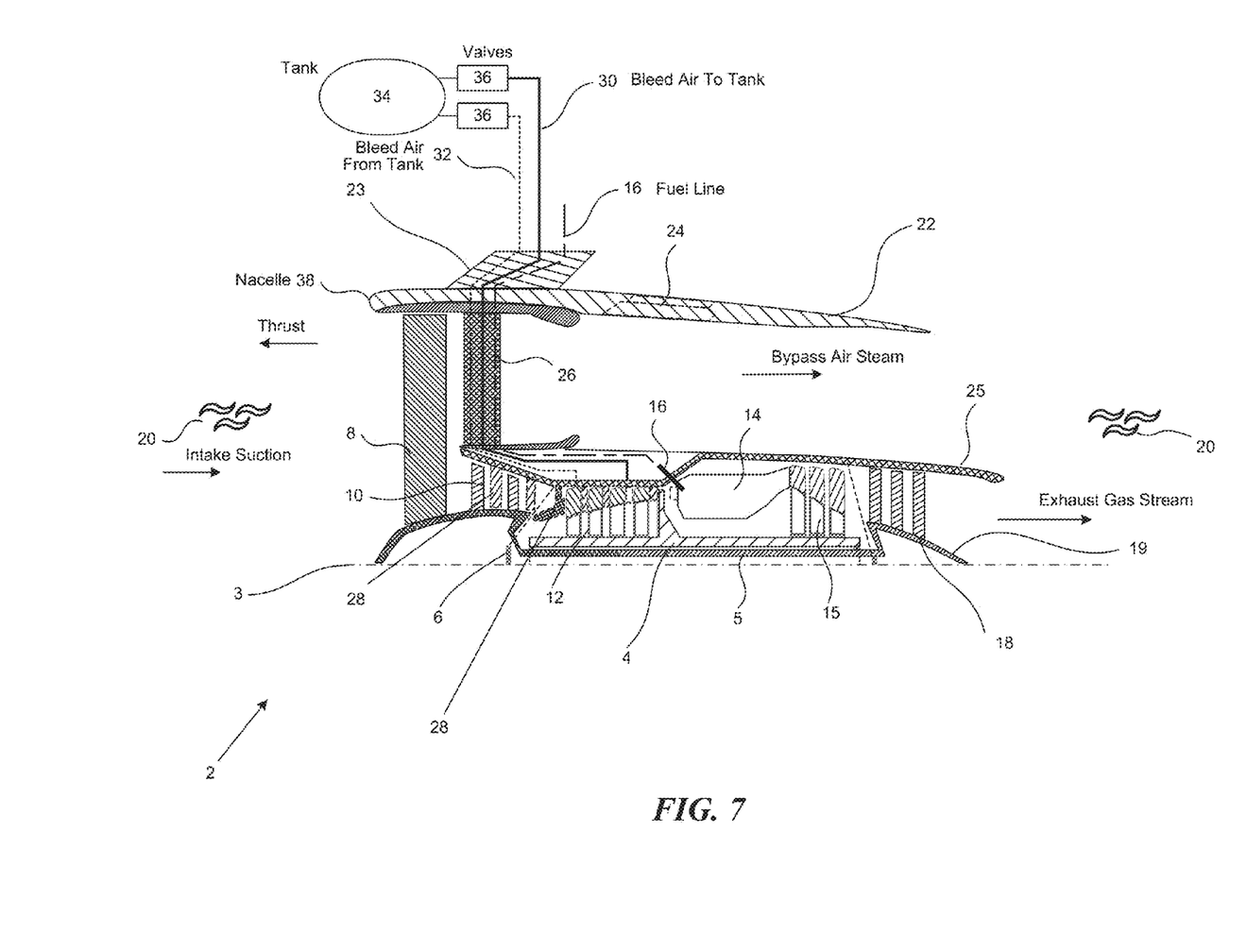
FIG. 7 is a cutaway illustration of an alternate embodiment of jet engine with an onboard tank.

FIG. 7 is a cutaway illustration of an alternate embodiment of a jet engine with an onboard tank. In this embodiment, the injection line 32 is located at the upstream end of the high-pressure compressor 12. The reduced heat and pressure of this embodiment may reduce material complexity but include more parts. In some embodiments, air is supplied to existing bleed air supply lines in order to direct the airflow back into the high-pressure compressor 12, without creating new taps or nozzles specific to the direction of the airflow. Aided thrust recovery should not interfere with down-stream bleed air systems that regulate cabin pressure since those sub-systems already detect and respond to flow and pressure conditions that might occur in un-aided thrust recovery.

The process of thrust recovery is similar to that of releasing a car's manual transmission clutch. The angular momentum of the car engine's flywheel is transferred to the wheels for rotation of the tires through releasing the clutch pedal. Drivers learn to press on both the engine fuel pedal and the clutch pedal to match the rotation speed of the engine to the current velocity of and load on the wheels by selecting the right gear and fuel, throttle, or accelerator pedal position.

Operating a turbofan engine during traditional thrust recovery at low airspeed and rotational velocity would feel like a car stuck in high gear at slow speeds attempting to accelerate up a hill. The driver would engage the clutch to separate the engine from the load. The driver can then increase fuel to increase engine spin rates and momentum to enable higher power transfer to the load before smoothly dis-engaging the clutch. For the turbofan engine, this means providing stored air to quickly spin up the combustor turbine and then reducing stored air flow to the combustor in a controlled manner similar to how drivers would control the clutch to prevent stalling the engine.

The slow response to pilot demands for increased thrust during approach is an artifact of the bypass ratio of modern engines. The higher ratios require longer ramp times due to limited rate of increased airflow supplied to the combustor through the fan. The rate of thrust increase is limited by the rate of increase in air supply to the combustor intake. This in turn is limited by the low flow rate of air through the fan and the angular inertia of the large fan.

Figure 8:
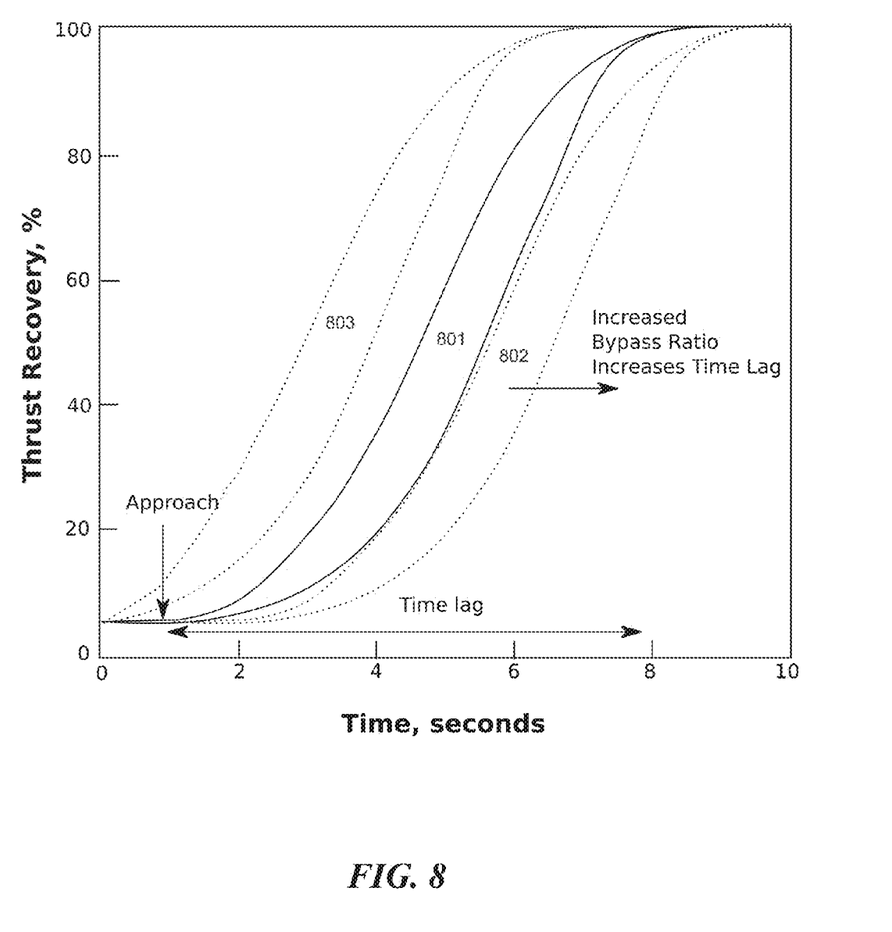
FIG. 8 is an example of a graph of thrust lag time from a bypass turbofan engine in accordance with various embodiments.

FIG. 8 is an example of a graph of thrust lag time from a bypass turbofan engine in accordance with various embodiments. This lag can be seen in the typical throttle recovery response for bypass turbofan engines in FIG. 8. The portion of the diagram labeled "Approach" shows the lag to demanded thrust during recovery. The lag time during full thrust recovery process is more pronounced with increased bypass ratios. Higher bypass ratios shift the performance curve from point 801 in FIG. 8 to point 802 in FIG. 8. The region between solid lines represents the performance of one particular engine over varying atmospheric conditions of airport altitudes, temperature, pressure, humidity and headwinds. The areas between dotted lines represent the change in recovery performance from the nominal model that produced the solid line response. Aided thrust recovery expects to shift the performance from 801 to 803. Using the car analogy, higher bypass ratios respond like accelerating a slow moving car with its transmission in too high a gear for the engine to produce adequate response for increased speed.

A better design meets thrust response times from a reduced throttle setting. This allows pilots to safely control their aircraft while reducing noise and pollution from wasted jet-fuel combustion. The potentially smaller wake and steeper glide slope would reduce the time wasted due to engine operational limitations. This can be seen as shifting thrust recovery performance towards operational range 803 in FIG. 8.

Turning off the combustor completely would provide the most benefits, but the particular benefits of carbon monoxide reduction may not apply to the engine when operated at idle throttle settings during approach versus idle throttle settings on the ground. The freedom to turn off the combustor would depend upon how effectively passive engines can supply power needed to control systems. For situations where bleed air supply is insufficient without fuel combustion, air stored onboard can power airplane control so long as enough stored air capacity remains to produce the rapid thrust response needed for safely aborting the landing.

Other embodiments of the invention comprise stored or generated oxygen for aided thrust recovery. In these embodiments, single-use canisters of pure oxygen or oxygen-rich air are used. In this case, the systems would always be available and no pilot indictor would be needed. For the purposes of this disclosure, references to the terms "combustor" and "combustor turbine" comprise the chamber in a jet engine where a combustion reaction occurs; the apparatus that combines heat (spark), fuel vapors, and oxygen; and the jet engine turbine, which receives the most direct force from combustion reactions occurring within the jet engine. Components of the combustor or combustor turbine that can be activated comprise any moving parts and any active air pressure zones within the area of the engine, which can be referred to as the "combustor" or "combustor turbine."

Some embodiments include a method for thrust recovery in a jet engine. The method can include: storing high-pressure bleed air from a compressor on the jet engine in at least an onboard tank. Substantially deactivating a combustor of the jet engine during flight. Operating a valve to feed high-pressure gas from the onboard tank through the jet engine thereby reactivating the combustor. The high-pressure bleed air can be stored after a cruise phase of flight operation has ended. Operating the valve can include injecting high-pressure gas into the jet engine at a compressor intake. Operating the valve can include injecting high-pressure gas into the jet engine at a high-pressure compressor. The high-pressure gas can be the high-pressure bleed air.

In some embodiments where aircraft engines have integrated electric power generation for onboard systems, the same technique of storing compressed air during descent can be accomplished with electric compressors or tanks filled on the ground before flight. It is also possible to charge the onboard batteries during descent to then enable the engine starter mechanism during aided thrust recovery to increase the spin rate of the compressor from the combined electric motor torque and increased fuel combustion at settings other than those typical for cold starting on the ground. The flight computer would detect the condition of sufficient stored battery power before allowing the aircraft to enter the aided thrust recovery mode. For aircraft with reduced bleed air systems, the stored air could be nearest the engine since these models still rely upon bleed air heat and pressure to de-ice nacelles and so must contain minimal ducting that can supply bleed air during descent for later aided thrust recovery.

In some embodiments, the storage tank or tanks can be housed within the engine near the high-pressure compressor. This mode would still allow downstream uses of bleed air within the engine and de-icing on the nacelle 38 in FIG. 3 and for mixing and cooling within the engine as in FIG. 4 and would prevent the need for routing bleed air supplies into the wing for aircraft with electric onboard power design architectures.

In some embodiments, the method can further comprise substantially separating one or more non-oxygen components of the high-pressure bleed air and/or directing one or more non-oxygen components of the high-pressure bleed air to customer air. The high-pressure gas can comprise oxygen-rich bleed air. In some embodiments, the method can further comprise monitoring the storing of high-pressure bleed air in the onboard tank and displaying, via a pilot terminal, an indication that sufficient high-pressure bleed air has been stored to reactivate the combustor. Operating the valve can be responsive to a throttle adjustment for the jet engine. In some embodiments, the method can further comprise performing an air clutching operation to reconnect the combustor while at high rate of spin to a fan by gradually reducing air supply from the onboard tank to ensure combustor spin rates produce the maximum energy transfer rate to the fan and the low pressure turbine while airflow is restored through the fan.

Some embodiments include a jet engine apparatus. The jet engine apparatus can include a combustor operable to provide thrust to the jet engine; a high-pressure compressor, which feeds air to the combustor and gives off a bleed air supply; an onboard air tank storing high-pressure air; a bleed air exchange port disposed between the high-pressure compressor and the onboard air tank to receive the bleed air supply from the high-pressure compressor; a spin-up valve system located within the bleed air exchange port and actuated from a cockpit of an airplane which, when opened, directs air flow through the bleed air exchange port; a valve controller configured to cause the spin-up valve system to draw the bleed air supply from the high-pressure compressor through the bleed air exchange port into the onboard air tank while the jet engine is in operation and to direct high-pressure air from the onboard tank through the bleed air exchange port and to the combustor thereby spinning up the combustor when the jet engine is substantially not in operation; or any combination thereof.

The jet engine apparatus can further comprise a pressure sensor capable of detecting when sufficient high-pressure air is contained in the onboard air tank to spin up the combustor. The jet engine apparatus can further comprise a controller capable of receiving signals readings from a plurality of sensors and instruments on the airplane. When predetermined signal readings are received, the controller can be configured to cause throttling in the cockpit to actuate the spin-up valve. The controller can direct a clutching operation to reconnect the combustor while at high rate of spin to a turbofan by gradually reducing air supply from the onboard air tank to ensure combustor spin-rates are held as high as possible while suction is increased behind the turbofan leading to a sustained supply of fresh air through the fan for combustion and thrust. This mode may prevent pilot response delays from impacting aided thrust recovery safety and performance. This mode may also facilitate a remotely triggered safety override mode that could allow air traffic controllers to provide as much response time for go around maneuvers as possible in the event of conditions that close the runway to approaching aircraft.

The onboard air tank can be a fuel tank. The bleed air exchange port can be connected directly to the combustor such that air from the onboard tank is directed into the combustor. The spin-up valve system can comprise a plurality of valves. The jet engine apparatus can further comprise an air separator inside the bleed air exchange port and operative to ensure that the air directed towards the combustor from the onboard air tank is substantially oxygen gas.

Some embodiments include a method for thrust recovery in jet engines. The method can comprise: at least substantially deactivating a combustor of a jet engine during flight; operating a valve to feed high-pressure oxygen from an auxiliary high-pressure oxygen tank through the jet engine thereby reactivating the combustor; replacing an empty auxiliary high-pressure oxygen tank with a full auxiliary high pressure oxygen tanks; or any combination thereof.

Some embodiments can include a method of constructing a thrust recovery system for a jet engine. The method can comprise: installing an air tank in an airplane body; connecting feed lines which join the air tank to any of a high-pressure compressor of the jet engine and/or a combustor of the jet engine; affixing a valve system to the feed lines to direct flow of bleed air generated by the jet engine; providing a valve control system responsive to throttle adjustment for the jet engine enabling bleed air to flow to and from the jet engine and the air tank; or any combination thereof. The method can further comprise installing a pressure gauge to the air tank and connecting the pressure gauge to a pilot display terminal. The method can further comprise affixing outputs of a plurality of airplane instruments to the valve control system.

The invention claimed is:

1. A method for thrust recovery in a jet engine, comprising:
   storing pressurized gas including at least a portion of a pressurized bleed air from a compressor on the jet engine in at least an onboard tank;
   substantially deactivating a combustor of the jet engine during flight;
   operating a valve to feed the pressurized gas from the onboard tank through the jet engine thereby reactivating the combustor;
   monitoring the storing of the pressurized gas in the onboard tank; and
   displaying via a pilot terminal an indication that sufficient pressurized gas has been stored to reactivate the combustor.

2. The method of claim 1, wherein said storing the pressurized gas occurs after a cruise phase of flight operation has ended.

3. The method of claim 1, wherein operating the valve includes injecting the pressurized gas into the jet engine at a compressor intake.

4. The method of claim 1, wherein operating the valve includes injecting the pressurized gas into the jet engine at a high-pressure compressor.

5. The method of claim 1, wherein the pressurized gas is entirely the pressurized bleed air.

6. The method of claim 1, further comprising:
substantially separating one or more non-oxygen components of the pressurized bleed air; and
directing the one or more non-oxygen components of the pressurized bleed air to customer air; and
wherein the portion of the pressurized bleed air is oxygen-rich bleed air and the pressurized gas comprises the oxygen-rich bleed air.

7. The method of claim 1, wherein said operating the valve is responsive to a throttle adjustment for the jet engine.

8. The method of claim 1, further comprising:
reconnecting the combustor to a turbofan by gradually reducing the feed of the pressurized gas from the onboard tank to ensure maximum spin rates of a combustor turbine while airflow is increased through the turbofan to support sustained operation from ambient air.

9. The method of claim 1, further comprising:
opening a set of reverse thrust doors on the jet engine during landing of an associated aircraft.

10. The method of claim 1, wherein the onboard tank is a fuel tank.

11. The method of claim 1, wherein the pressurized gas is 275 kPa.

12. A method for thrust recovery in a jet engine, comprising:
storing a gas including at least a portion of a bleed air from a compressor on the jet engine in an onboard tank;
substantially deactivating a combustor of the jet engine during flight;
operating a valve to feed the gas from the onboard tank through the jet engine thereby reactivating the combustor;
monitoring the storing of the gas in the onboard tank; and
displaying via a pilot terminal an indication that sufficient gas has been stored to reactivate the combustor.

13. The method of claim 12, wherein said storing the gas occurs after a cruise phase of flight operation has ended.

14. The method of claim 12, wherein operating the valve includes injecting the gas into the jet engine at a compressor intake.

15. The method of claim 12, wherein operating the valve includes injecting the gas into the jet engine at a high-pressure compressor.

16. The method of claim 12, further comprising:
substantially separating one or more non-oxygen components of the bleed air; and
directing the one or more non-oxygen components of the bleed air to customer air; and
wherein the gas comprises oxygen-rich bleed air.

17. The method of claim 12, wherein said operating the valve is responsive to a throttle adjustment for the jet engine.

18. The method of claim 12, further comprising:
reconnecting the combustor to a turbofan by gradually reducing the feed of the gas from the onboard tank to ensure maximum spin rates of a combustor turbine while airflow is increased through the turbofan to support sustained operation from ambient air.

19. The method of claim 12, further comprising:
opening a set of reverse thrust doors on the jet engine during landing of an associated aircraft.

* * * * *